H. D. PALMER.
OIL BASIN.
APPLICATION FILED MAY 14, 1919.

1,396,050.

Patented Nov. 8, 1921.
2 SHEETS—SHEET 1.

INVENTOR.
Herman D. Palmer.
By Miller, Chindall Parker
ATTORNEYS.

H. D. PALMER.
OIL BASIN.
APPLICATION FILED MAY 14, 1919.
1,396,050.
Patented Nov. 8, 1921.
2 SHEETS—SHEET 2.
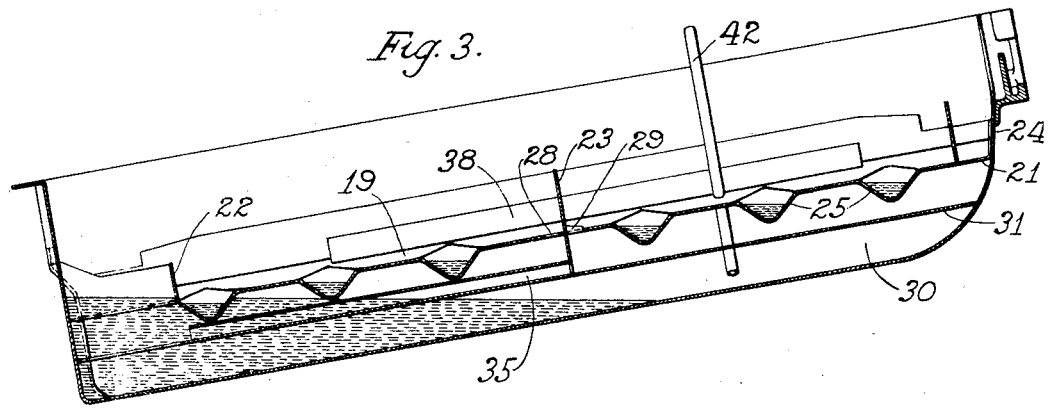
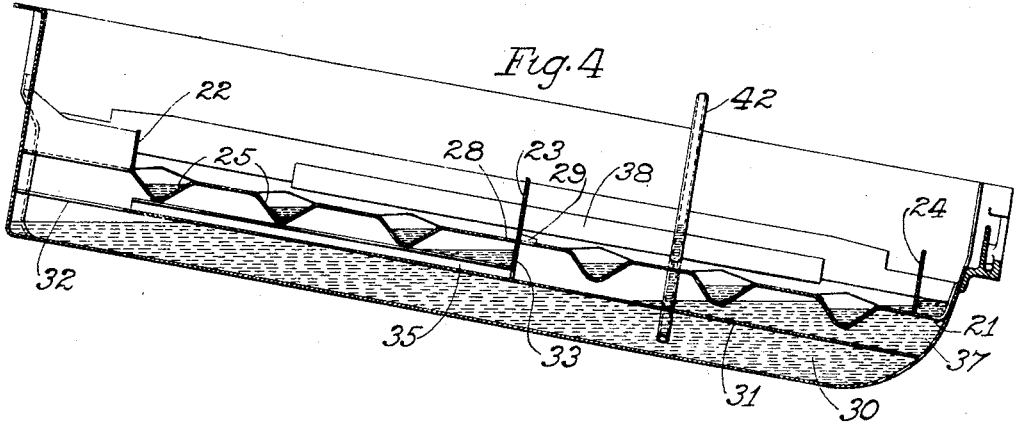
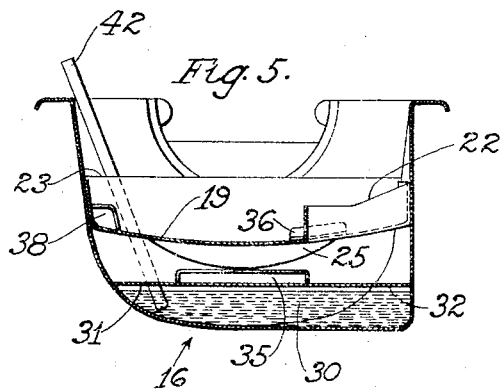
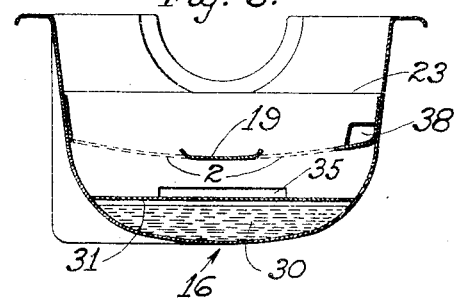
INVENTOR.
Herman D. Palmer.
By Miller Chridell & Parker
ATTORNEYS.

UNITED STATES PATENT OFFICE.

HERMAN D. PALMER, OF HARTFORD, WISCONSIN, ASSIGNOR TO KISSEL MOTOR CAR COMPANY, OF HARTFORD, WISCONSIN, A CORPORATION OF WISCONSIN.

OIL-BASIN.

1,396,050.

Specification of Letters Patent. Patented Nov. 8, 1921.

Application filed May 14, 1919. Serial No. 297,036.

*To all whom it may concern:*

Be it known that I, HERMAN D. PALMER, residing at Hartford, in the county of Washington and State of Wisconsin, have invented certain new and useful Improvements in Oil-Basins, of which the following is a specification.

My invention relates to oil basins for internal combustion engines, more especially those of the type used in motor vehicles, boats and flying machines.

When a motor vehicle is descending or ascending a steep grade or pitching in a heavy sea, the oil in the oil basin flows to the lower end. If lubrication of the cylinder walls and connecting rod bearings is by the splash system, the cylinder at the high end is insufficiently lubricated and at the low end great quantities of oil are splashed onto the cylinder, working up past the piston rings and fouling the spark plug.

One object of my invention is to completely eliminate this troublesome defect in lubrication systems operating wholly or partly on the splash system.

Another object is to secure approximately uniform oil supply by splashing to all the cylinders of a multicylinder engine under actual service conditions.

Another object is to provide a supply of oil for the lubricating pump under all conditions of service and tipping, without using a sump or depression. This makes it possible to use an oil basin of simple shape and one which does not extend back beyond the rear bearing of the crankshaft.

A special object is to assure proper distribution of the oil when the basin is filled to provide an immediate supply of lubricant to all parts of the engine when it is started for the first time or when the basin has been emptied and refilled.

Still another object is to accomplish these results without the use of any moving parts, and by an arrangement of stationary parts that will be relatively simple, inexpensive to manufacture, easy to assemble, and of ample rigidity to withstand the loads and vibrations to which it will be subjected in service.

Other objects and advantages of my invention will be apparent upon further description thereof.

Figure 1:
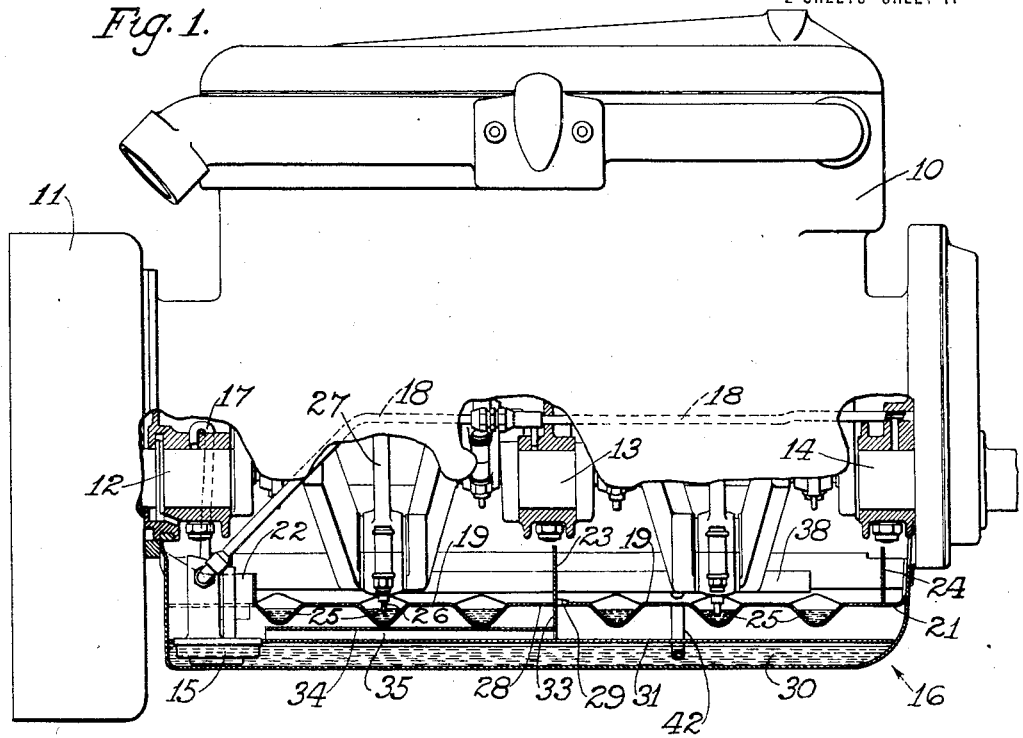
Figure 2:
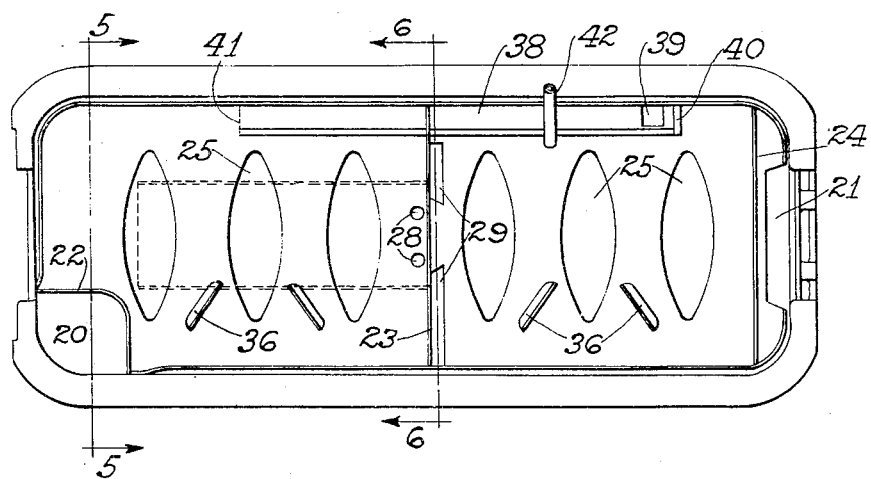

In the accompanying drawings Figure 1 is a side elevation of an internal combustion engine, with the casing broken away to show in section the details of my invention as applied to a six cylinder engine. Fig. 2 is a plan view of the oil basin. Fig. 3 is a sectional view of the oil basin with the front end tipped up, showing the disposition of oil under such conditions. Fig. 4 is a similar view with the front end tipped down. Figs. 5 and 6 are transverse sections on lines 5—5 and 6—6 respectively of Fig. 2, looking in the direction of the arrows, the oil level being shown as it is when the engine is running and the casing is level.

The main features of my invention comprise a splash pan spaced from the bottom of the basin to receive oil overflowing from the main crankshaft bearings and hold enough of it to provide splash lubrication for the connecting rod bearings and cylinder walls. To prevent the supply of oil in the bottom of the basin from flowing up over the low end of the splash pan when tipping occurs the pan is united along both sides to the walls of the basin and provided with upwardly extending vertical partitions or dams at each end forming a chamber closed at both ends and on all sides. Oil escapes from this chamber at the center through suitable openings, and another vertical dam at the center checks surges of the oil in the splash pan itself and directs the surplus oil to the openings. A pocket at the bottom of the basin is provided of sufficient size to be just filled by the surplus oil in the bottom of the basin. This pocket is open only at the rear end around the oil pump and upon forward tipping holds all the surplus oil in place. The stream of oil flowing over the top of this pocket on its way back from the splash pan is kept in two separate parts, one of which upon forward tipping will be caught by a partition constituting a downward extension of the center dam for the splash pan, and extending between the splash pan and the upper wall of the pocket; and the other of which will be allowed to flow to the front end of the basin. This subdivision of the oil stream materially reduces the necessary height to which the dams must rise to effectively keep oil from flowing in at the ends of the basin, and also by obstructing slightly the flow of the returning stream of oil provides for the accumulation of oil in this stream in an amount increasing rapidly with the size of the stream flowing. As will be pointed out below this increase is peculiarly advantageous in connection with the type of power plant with which the specific embodiment of my invention herein disclosed is to be associated.

Referring to Fig. 1, 10 designates the casing of an internal combustion engine. A small casing 11 covers the clutch at the rear end through which power is transmitted from the engine. The engine illustrated has a six throw crankshaft with three main bearings 12, 13 and 14. A suitable oil pump 15 at the bottom of the oil basin 16 supplies oil to the main bearings through suitable oil tubes 17 and 18.

A splash pan 19 extending below the crankshaft is united at its periphery with the walls of the basin, and is cut away at 20 and 21. (See Figs. 1 and 2). Around the opening at 20 in the splash pan 19 a vertical wall or dam 22 is provided. At the center a vertical center dam 23 extends upward to a considerable height above the splash pan, and near the front end of the splash pan a front dam 24 extends upwardly from said pan as shown.

Transversely extending trough-like depressions 25 are formed in the splash pan, one under each cylinder of the engine. A finger 26 on the corresponding connecting rod 27 sweeps through each trough at each revolution of the engine.

Oil flows out of the basin at the center, through openings 28 located just in rear of, and slots 29 located just in front of, the central dam 23.

A pocket 30 is formed at the bottom of the basin by a horizontally extending diaphragm 31 spaced from the bottom and united throughout its periphery with the walls of the basin, and cut away only at 32 (see Figs. 4 and 5) to leave a clearance for the oil pump and an opening for the entrance and egress of the oil.

The space between the diaphragm 31 and the splash pan 19 is divided at the center by a partition 33 formed as an extension of the dam 23. The stream of oil from the front half of the splash pan falls in front of this partition at the sides of the basin through the slots 29 and spreads out over the top of the diaphragm 31. A channel 34 laid on the top of the diaphragm and extending rearwardly from an aperture conforming thereto in the partition 33 defines a passage-way 35 extending from the center almost to the rear end of the basin, through which the oil from the front half of the splash pan may flow back to the pocket 30. The oil from the rear half of the splash pan falls through the holes 28 striking the top of the channel 34, spreading out over it and flowing along on either side of it back to the opening 32.

In operation, the improved oil basin is to be filled with a given amount of oil, such that when the engine is running and the walls of the basin, and the surfaces of the splash pan 19, the diaphragm 31 and the engine parts to be lubricated are freely bathed in oil, a surplus of oil will remain, filling the basin to the level indicated in Figs. 5 and 6, being a trifle below the diaphragm 31. The pump 15 continually draws oil from this surplus, forcing it into the main bearings 12, 13 and 14, from which it rains or flows into the splash pan 19, filling the troughs 25. The fingers 26 splash the oil in troughs 25 in all directions thoroughly wetting the lower connecting rod bearings and adjoining crankshaft cheeks. These wetted parts during their revolution throw off the oil splashed on them upwardly onto the cylinder walls and upper connecting rod bearings. All the bearings of the engine are thus continuously and copiously wetted with oil.

The walls of the oil basin are also bathed in oil, especially on the righthand side, because fingers 26 sweep through troughs 25 from left to right, and a heavy layer of oil is continually trickling down the righthand side of the basin above the splash pan. As the oil falling from the main bearings is concentrated at the ends and the center, the second and fifth crank throws counting from either end of the shaft, are each located in the middle of a group of three, with the main supply of oil coming to the two end throws of the group. Lugs 36 converging as shown in Fig. 2, direct the oil trickling down the right wall of the basin away from the troughs under cylinders 1, 3, 4 and 6, into the troughs under cylinders 2 and 5 and thus equalize the oil supply to all the cylinders.

Fig. 4 shows the disposition of oil when the front end of the casing is tipped down for any reason. It will be seen that practically the entire surplus of oil in pocket 30 is confined therein and undisturbed by the tipping, and that for some time the oil thus held by the pocket will continue to supply the lubricating pump 15. A considerable amount of oil lying on top of diaphragm 31 in front of partition 33 and the oil flowing in passage-way 35, will accumulate at the front end as shown at 37. This oil is prevented from flowing back above the splash pan and fouling the front cylinder by the front dam 24.

Fig. 3 shows the disposition of the oil when for any reason the front end of the casing is tipped up. The oil between diaphragm 31 and splash pan 19 will accumulate at the rear end as shown in this figure, but will be prevented from getting into the splash pan and fouling the rear cylinder by the dam 22.

The dams 22 and 24 may be of any necessary height to effectively prevent oil from flowing over them. The oil basin shown has been designed for use in connection with the oiling system disclosed in a copending application Serial No. 297,079, filed May 14, 1919, by Joseph A. Tarkington and myself as joint inventors in which automatic means is provided for increasing the rate of flow of the lubricating oil when the power requirements are heavy. It will be noted that when a motor vehicle is climbing a hill the throttle is usually well opened and the power requirements large. It has been found that for this reason when the pan is in the position shown in Fig. 3, the amount of oil spread over the surfaces of the parts and taken up in the streams of oil returning to the surplus body of oil is materially increased and that the rear dam 22 need not be quite as high as the front dam 24.

When the basin is empty for any reason, it is filled through a suitable opening in the casing 10 which opening in the present design happens to be near the front end. This oil would fill the front half of the splash pan and from there flow to the lower pocket, but on starting the engine the rear half of the splash pan would be dry and empty until the engine had been running for some little time. To avoid the possibility of injury to the rear cylinders under such conditions, I have provided a horizontal tube 38 having an opening 39 in its upper side and under the opening in the casing through which the oil is poured. The tube is closed at its front end at 40 and extends through the dam 23 terminating in an open end 41 in the rear half of the splash pan. As the oil splashes down into the pan a part of it will fall through the opening 39 and flow through the tube 38 into the rear half of the splash pan. An immediate supply of lubricant to all parts of the engine when it is first started is thus assured.

Suitable means for mounting an indicator to show the level of the oil in the basin consists of a tube 42 extending diagonally upward from a point in the bottom pocket through the diaphragm 31 and splash pan 19 to a point outside the casing 10.

From the foregoing description it will be apparent that I have provided an oil basin that can be readily constructed by an ordinary tinsmith and that will prevent overlubrication of the end cylinders and assure immediate, sufficient and uniform lubrication of all the cylinders under any ordinarily severe conditions of service.

The elimination of a sump for the oil pump diminishes the necessary vertical dimension of the entire power plant. This sump is frequently placed in the clutch casing to avoid a downward projection under the engine, but an oil basin extending under the clutch is much more complicated in shape and expensive to make, and much more likely to spring leaks under the strain and vibration of service than the structure I have disclosed.

I claim as my invention:

1. A power plant having, in combination, main bearings, means for supplying oil to said main bearings, and a splash pan below said crankshaft extending throughout the length thereof, said splash pan being adapted to catch the overflow of oil from said main bearings, said splash pan having overflow apertures in its bottom approximately midway between its ends and being otherwise imperforate.

2. A power plant having, in combination, main bearings, means for supplying oil to said main bearings, a splash pan below said main bearings, said splash pan being adapted to catch the overflow of oil from said main bearings, and walls completely inclosing said splash pan throughout its entire periphery and extending above the level of said pan, said splash pan having overflow apertures in its bottom approximately midway between its ends and being otherwise imperforate.

3. A power plant having, in combination, main bearings, means for supplying oil to said main bearings, a splash pan adapted to catch the overflow of oil from said main bearings, walls completely inclosing said splash pan throughout its periphery and extending above the level of said pan, and apertures midway between the ends of the bottom of said pan for the overflow of oil, said pan being otherwise imperforate.

4. A power plant having, in combination, main bearings, means for supplying oil to said main bearings, a splash pan adapted to catch the overflow of oil from said main bearings, walls completely inclosing said splash pan throughout its periphery and extending above the level of said pan, a transverse partition extending upwardly from said splash pan approximately midway between its ends, and apertures in the bottom of said pan adjacent to said partition on each side thereof.

5. In a device of the class described, a splash pan, main bearings located above said splash pan from which oil may flow into said pan, and means preventing the access of oil to said pan from any other source.

6. A splash pan having a bottom, said bottom being longitudinally straight and continuous except for a series of transverse trough-like depressions therein, and apertures for the overflow of oil located at the center of said pan, said pan being otherwise imperforate.

7. A splash pan having a bottom, apertures in said bottom for the overflow of oil, and a central transverse partition extending upwardly from said splash pan, said apertures being located on both sides of said partition in proximity thereto.

8. A splash pan having a bottom, centrally located apertures in said bottom for the overflow of oil, said bottom being otherwise imperforate, and a continuous oil-tight barrier extending around the periphery of said pan and upwardly above the level thereof.

9. The combination recited in claim 7 in combination with a continuous, upwardly extending oil-tight barrier around the periphery of said pan.

10. An oil basin having a bottom pocket closed except for a single aperture at one end of the basin, and a splash pan spaced above the top wall of said pocket.

11. The combination recited in claim 10 in combination with a pump having an intake at the bottom of the basin and extending upwardly through said aperture.

12. The combination recited in claim 10 in which said aperture is located at the rear end of said basin.

13. An oil basin having an approximately flat horizontal bottom, a horizontally extending diaphragm united to the walls of said basin throughout its periphery, except for an aperture at one end of said basin, and a splash pan above said diaphragm.

14. An oil basin having a bottom, a diaphragm forming a pocket with the side walls and bottom of said basin and a splash pan above said diaphragm.

15. In a device of the class described, a casing, a splash pan terminating at both ends short of the end of the casing, an oil storage space below said splash pan, and means preventing a flow of oil from said storage space into said splash pan.

16. An oil basin having an approximately level bottom, a pump adjacent to said bottom at one end thereof, and means for preventing the oil in said basin from flowing away from said pump when said basin is tipped.

17. An oil basin having a bottom, a horizontal diaphragm above said bottom forming a pocket, means delivering oil from said pocket and allowing it to flow back to said pocket, and means dividing the returning stream of oil into two approximately equal parts.

18. An oil basin having a bottom, a diaphragm above said bottom forming a pocket open at one end only, a splash pan above said diaphragm, means for allowing oil to overflow from said splash pan and fall upon said diaphragm, and means for dividing the oil falling upon said diaphragm into two approximately equal streams.

19. An oil basin having a bottom, a diaphragm spaced from said bottom and forming a pocket open at one end only, a splash pan above said pocket, a vertical dam extending above said splash pan and dividing it into two portions, a vertical partition dividing the space between said splash pan and said diaphragm into two corresponding portions, and apertures permitting the overflow of oil from each portion of said splash pan into the corresponding space above said diaphragm.

20. An oil basin having, in combination, a bottom, a diaphragm spaced from said bottom and forming a pocket open at one end only, a splash pan above said diaphragm, and a transverse partition extending upwardly from said diaphragm through and above said splash pan.

21. An oil basin having a bottom, a diaphragm spaced from said bottom and forming a pocket open at one end only, a splash pan above said diaphragm, a transverse partition extending upwardly from the approximate center of said diaphragm through and above said splash pan, a central passageway overlying said diaphragm and extending from said vertical partition longitudinally, means in the portion of said splash pan located above said passage-way for the overflow of oil adjacent the center of said partition, and means laterally spaced adjacent each end of said partition for the overflow of oil from the other portion of said splash pan.

22. A power plant having, in combination, main bearings, means for supplying oil to said main bearings, an oil basin, a splash pan extending below said main bearings and having dams at its ends, said dams being spaced from the ends of said basin.

23. An oil basin having, in combination, a diaphragm spaced from the bottom thereof and forming a pocket open at one end of said basin only, and an oil gage tube entering said pocket and extending continuously upward therefrom.

24. A power plant having, in combination, main bearings, means for supplying oil to said main bearings, an oil basin, a splash pan in said oil basin and united to the walls thereof, said splash pan being cut away at the front end to provide an aperture adjacent to the wall of the basin, and a vertical dam separating the space above said splash pan from said aperture.

25. An oil basin having, in combination, a diaphragm spaced from the bottom thereof and united thereto throughout its periphery, said diaphragm having an aperture at one end of said basin, a splash pan vertically spaced above said diaphragm and united to the walls of said basin along both sides, and a vertical dam adjacent each end of said splash pan.

26. An oil basin having, in combination, a diaphragm spaced from the bottom thereof and forming a pocket open at one end only, a splash pan vertically spaced above said diaphragm, and a vertically extending dam at each end of said splash pan.

27. The combination recited in claim 26 in which said splash pan is cut away at the center to form apertures.

28. The combination recited in claim 26 in combination with a vertically extending dam at the center of said splash pan, said splash pan being cut away on either side of said vertically extending dam to provide apertures.

29. In a device of the class described, a splash pan, upwardly extending walls at each side of said splash pan, an upwardly extending dam at each end of said splash pan, an upwardly extending dam at the center of said splash pan, said splash pan being cut away adjacent to said center dam on either side thereof to provide apertures for the escape of oil.

30. In a device of the class described, a splash pan, a vertically extending dam at the center of said splash pan dividing it into two compartments, a tubular passage-way extending through said dam from one compartment to the other, said passage-way having a vertically disposed opening at one end, and a horizontally disposed opening at the other end, said horizontally disposed opening being adapted to catch oil poured upon said splash pan and divert a portion thereof into said passage-way.

31. In a device of the class described, a splash pan divided into a plurality of compartments, and means for catching oil poured into one of said compartments for filling said pan and conveying it to another.

32. In a device of the class described, a splash pan, a vertically extending dam at the center of said splash pan dividing it into two compartments, and a tubular passage-way extending through said dam from one compartment to the other.

33. In a device of the class described, a splash pan, means located above said splash pan from which oil may flow into said pan and means preventing the access of oil to said pan from any other source, said pan having a plurality of imperforate depressions forming pockets.

34. In a device of the class described, a basin, a splash pan having its ends spaced from the ends of said basin, means located above said splash pan from which oil may flow into said pan, and means preventing the access of oil to said pan from any other source.

35. An oil basin having a bottom pocket closed except for a single aperture at one end of the basin, and means adjacent the other end of the basin adapted to permit air to enter the pocket, but to prevent oil from leaving the pocket.

36. An oil basin having a bottom pocket closed except for a single aperture at one end of the basin and a gage tube adjacent the opposite end of the basin and entering said pocket.

37. An oil basin having a bottom pocket closed except for a single aperture at the rear end of the basin and an upwardly extending gage tube adjacent the front end of said basin, said gage tube communicating with the oil in said pocket.

38. An oil basin having an approximately level bottom, a pump adjacent to said bottom at one end thereof and means for preventing the oil in said basin from flowing to one end of said basin when said basin is tipped in one direction only.

39. A power plant having, in combination, main bearings, means for supplying oil to said main bearings, an oil basin, a splash pan extending below said main bearings and having an upstanding dam adjacent its front end spaced from the end of said basin.

40. In a device of the class described, a motor casing, an oil basin below said casing, said casing being apertured to permit oil to be poured into said basin, and means located below said aperture adapted to distribute the oil into various portions of said basin.

41. In a device of the class described, a motor casing, an oil basin below said casing, a splash pan spaced from the bottom of said basin, means dividing the space above said splash pan into a plurality of compartments, said casing being apertured to permit oil to be poured on said splash pan to fill said basin, and means extending beneath said aperture and through the various compartments adapted to divert a portion of the oil poured into one compartment into each other compartment.

In testimony whereof, I have hereunto set my hand.

HERMAN D. PALMER.